United States Patent
Mohr et al.

(10) Patent No.: US 11,228,202 B2
(45) Date of Patent: Jan. 18, 2022

(54) SYNCHRONIZED STANDBY STARTUP OF POWER SUPPLIES WITH CURRENT INJECTION

(71) Applicant: HEWLETT PACKARD ENTERPRISE DEVELOPMENT LP, Houston, TX (US)

(72) Inventors: David P. Mohr, Spring, TX (US); Daniel Humphrey, Tomball, TX (US); Stewart Gavin Goodson, II, Houston, TX (US); Robin Kelley Schrader, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 305 days.

(21) Appl. No.: 16/269,111

(22) Filed: Feb. 6, 2019

(65) Prior Publication Data
US 2020/0251924 A1    Aug. 6, 2020

(51) Int. Cl.
*H02J 9/06*    (2006.01)
*G06F 1/28*    (2006.01)

(52) U.S. Cl.
CPC .................. *H02J 9/06* (2013.01); *G06F 1/28* (2013.01)

(58) Field of Classification Search
CPC .......... H02J 9/06; H02J 2310/16; G06F 1/28; G06F 1/26; G06F 1/263; G06F 1/189; Y02B 70/30; Y04S 20/20
See application file for complete search history.

(56) References Cited

U.S. PATENT DOCUMENTS 3,815,014 A * 6/1974 Davis ...................... G05F 1/577
                                                       323/267
6,504,266 B1 * 1/2003 Ervin ........................ H02J 1/10
                                                        307/29
(Continued)

FOREIGN PATENT DOCUMENTS

CN        104866053 A    8/2015

OTHER PUBLICATIONS

Robert Kollman, "Power Tip 73: Synchronizing Makes for Well-behaved Power Supplies," Jul. 28, 2014, pp. 1-5 (online), Designlines, Retrieved from the Internet on Nov. 1, 2018 at URL:<eetimes.com/author.asp?section_id-183&doc_id-1323282>.

(Continued)

*Primary Examiner* — Pinping Sun
(74) *Attorney, Agent, or Firm* — McDermott Will & Emery (57) ABSTRACT

A system including multiple power supplies is provided. Each of the power supplies is configured to provide a standby power to a management unit in the system through a standby output and a main power through a main output, when an input power signal has been received for the system. The system also includes a resistor configured to receive a standby signal from each of the power supplies to raise a signal voltage, wherein the standby signal is a pre-selected current. The system also includes a controller in each of the power supplies, the controller configured to raise the signal voltage to the specified value when the signal voltage is greater than a threshold, and to enable the standby power from a respective power supply to reach the management unit when the signal voltage is within the specified value. A method to use the above system for a synchronized power supply to a management unit is also provided.

10 Claims, 5 Drawing Sheets

(56) References Cited

U.S. PATENT DOCUMENTS

| | | | |
|---|---|---|---|
| 6,614,133 B2 | 9/2003 | Belson et al. | |
| 8,276,000 B2* | 9/2012 | Humphrey | H02J 9/005 |
| | | | 713/300 |
| 8,552,586 B2* | 10/2013 | Kinnard | H02J 9/00 |
| | | | 307/43 |
| 8,754,544 B2 | 6/2014 | Colombi et al. | |
| 10,886,749 B2* | 1/2021 | Humphrey | G06F 9/30083 |
| 2003/0088655 A1* | 5/2003 | Leigh | H04L 41/0893 |
| | | | 709/223 |
| 2007/0188198 A1* | 8/2007 | Bird | G06F 1/263 |
| | | | 327/63 |
| 2010/0039836 A1* | 2/2010 | Gong | H02M 3/156 |
| | | | 363/21.13 |
| 2013/0187384 A1* | 7/2013 | Li | H02J 3/381 |
| | | | 290/44 |
| 2016/0105099 A1* | 4/2016 | Zeuch | H02J 9/061 |
| | | | 323/234 |

OTHER PUBLICATIONS

Steven Lee, "What Can You Expect From the New Generation of Power Supplies?," Dec. 13, 2017, pp. 1-15 (online), Electronic Design, Retrieved from the Internet on Oct. 31, 2018 at URL:<electronicdesign.com/power/what-can-you-expect-new-generation-power-supplies>.

* cited by examiner

SYNCHRONIZED STANDBY STARTUP OF POWER SUPPLIES WITH CURRENT INJECTION

BACKGROUND

Systems that use multiple power supplies to power up high power units, such as management units in multiple server configurations, typically use more than one power supply to feed a single processing unit. When two or more power supplies are required to turn 'on' a management unit, the first power supply that becomes available for the management unit immediately sees an upsurge in power load. This upsurge in power load may trigger an overload shutdown of the power supply, which then goes offline. In some situations, when one of the power supplies is offline the power 'on' sequence may become erratic due to the absence of at least one power source at a given time. Accordingly, in many instances the power 'on' process may have to be attempted multiple times, until enough power supplies are online at the same time that can handle the power load of the management unit. This makes the power 'on' process of the entire system unpredictable and potentially damaging for the power supplies, the management units, or even the main unit in the system.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Embodiments as disclosed herein are related to the field of computer systems that use high power configurations. For example, embodiments consistent with the present disclosure may include server farms in cloud computing architectures, database systems, and other network based computer applications that employ multiple processors requiring a heavy power load.

Large information-technology (IT) solutions (e.g., office servers and databases, branch office controllers, wireless local area network—WLAN-controllers, and the like) often involve significant power associated with management. Accordingly, a management unit is sometimes powered by a standby output of a power supply. As the power of the total solution increases, more standby power for management is desirable. However, standby converters in power supplies have much less power density than a primary output and a higher price per watt. To minimize size and cost, several smaller standby converters, over multiple power supplies, are used in parallel to provide the desired power to the management unit.

Standby converters are enabled automatically upon a system power up, running the risk of over-loading a standby output in the system. For example, a first standby converter to turn 'on' will see the entire management load. This can cause an over-current and prevent the entire system from powering up. Some solutions may include a multi-master communication bus between power supplies to prevent a single power supply from carrying all the system power. However, this approach requires addressing the power supplies over a communication protocol (extra signals). Moreover, in many instances it may not be possible to repurpose the signals (e.g., after a successful power up). The communication bus would also require a simultaneous command to issue a start signal, requiring communications pins on controllers, which incur into a cost premium. Other solutions simply let the standby controllers perform a random start-stop sequence ('hiccups') until the power supplies eventually synchronize to within a desirable time gap, to start up the system. Such approach can work when a small number of supplies are desired. However, as a higher number of the supplies are required to synchronize, the hiccup approach is less viable, or desirable. To solve this problem, embodiments as disclosed herein include a method and a system to synchronize startup.

Embodiments as disclosed herein provide a solution to the above problem by enabling each of multiple power supplies in the system to provide a standby power simultaneously, or almost simultaneously, to the management unit. Some embodiments avoid the shutting down of one or more power supplies during the system power up due to an unexpected overload surge in the power supply. Accordingly, embodiments as disclosed herein provide an extended lifetime for the power supplies, and a smooth and uneventful power up of the system.

For example, in some embodiments, each power supply includes two outputs, one for a main IT unit and one for a management unit, and a controller. Upon a system power up, the controller checks if either output in the power supply is already powered. When at least one of the power outputs is powered, the controller starts up the standby output. When none of the outputs is powered, the controller waits to see a signal voltage go to its maximum level (or some other pre-selected value). When the voltage is set to its maximum level, the controller then enables the standby output. When the tolerances are tight enough, the voltage setting to maximum may not be required. The controller is also configured to inject current into the signal voltage when the signal voltage is less than a threshold value. When the voltage goes above a threshold, the controller then injects more current, sufficient to set the signal to a maximum voltage. This indicates to itself and parallel power supplies to enable their standby outputs to the management unit (simultaneously, or almost simultaneously).

In a first embodiment, a system includes multiple power supplies, each of the power supplies configured to provide a standby power to a management unit in the system through a standby output and a main power through a main output, when an input power signal has been received for the system. The system also includes a resistor configured to receive a standby signal from each of the power supplies to raise a signal voltage. The system also includes a controller in each of the power supplies. The controller is configured to raise the signal voltage to the specified value when the signal voltage is greater than a threshold. The controller is also configured to enable the standby power from a respective power supply to reach the management unit when the signal voltage is within the specified value.

In a second embodiment, a method includes turning 'on' an input power for a power supply, and providing an internal bias to a terminal coupled to a resistor, to raise a signal voltage. The method also includes verifying whether the signal voltage is within a desirable range of a maximum value, and providing a standby output from multiple power supplies to a circuit when the signal voltage is within the maximum value. In some embodiments, to raise the signal voltage the method includes injecting a current through the resistor. Accordingly, race conditions between parallel supplies/controllers may be avoided. For example, when two parallel supplies inject a fixed current value each, both currents increase the signal by the same amount, thus avoiding a race condition.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
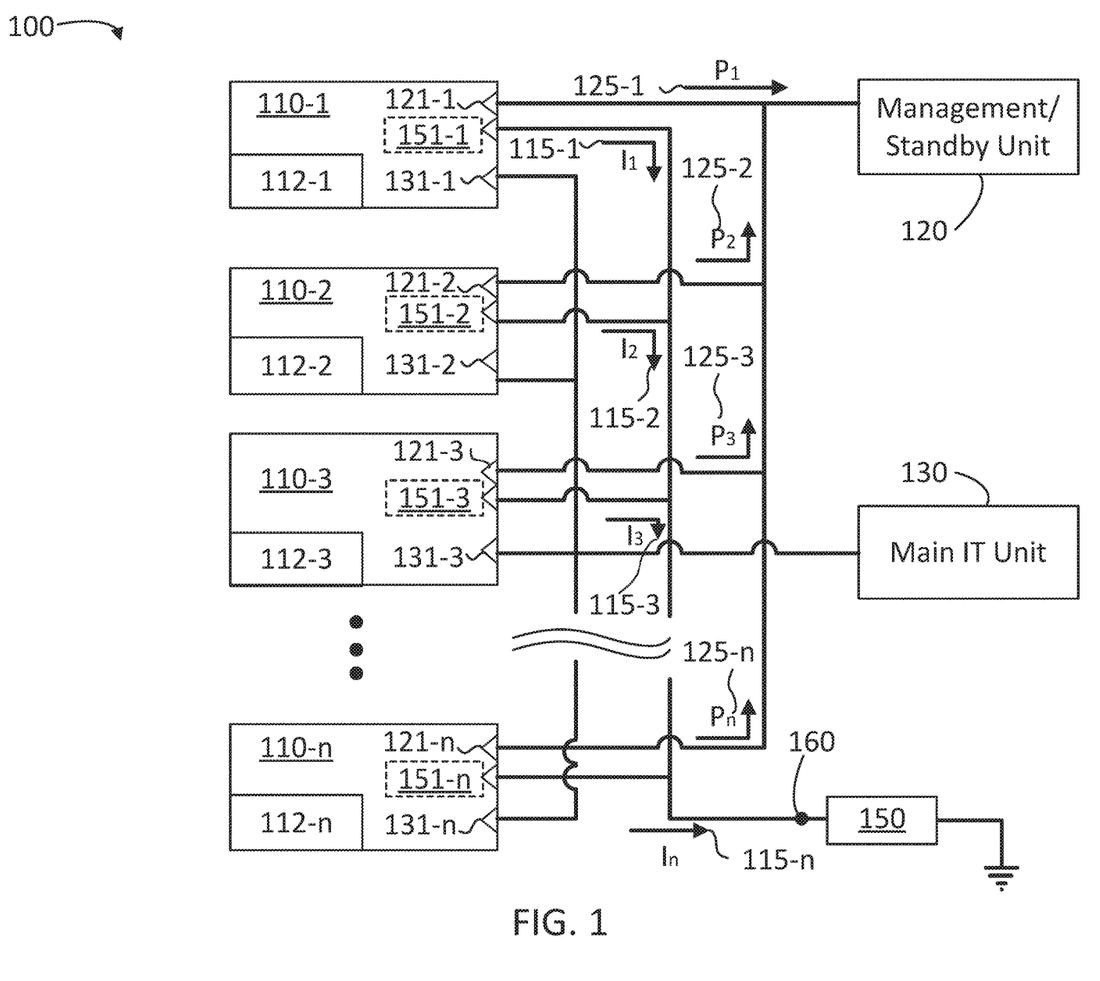
FIG. 1 illustrates an example system including multiple power supplies, a management unit using a standby power, and a main information-technology (IT) unit, according to some embodiments.

FIG. 1 illustrates an example system 100, including multiple power supplies 110-1, 110-2, 110-3, through 110-n (hereinafter, collectively referred to as "power supplies 110"), a management (or standby) unit 120, and a main IT unit 130, according to some embodiments. System 100 uses n power supplies 110 in parallel. Accordingly, 'n' may be any integer larger than one (1). System 100 provides a way to synchronize the startup of enough power supplies 110 to prevent over-current by utilizing a single signal connected to each power supply 110.

Management unit 120 is powered by a management power through a standby power 125-1 ($P_1$), 125-2 ($P_2$), 125-3 ($P_3$) through 125-n ($P_n$, hereinafter, collectively referred to as "standby powers 125") from power supplies 110. Management unit 120 provides out-of-band management support for multiple servers in a network hosted by a main IT unit 130. In some embodiments, particularly when main IT unit 130 handles multiple processors, the management power drawn by management unit 120 is greater than any of standby powers 125 provided by each of power supplies 110, individually. In such configurations, it is desirable to synchronize the startup of power supplies 110 so that all the operational power to management unit 120 is provided at the same time, or almost simultaneously, and no overload errors in power supplies 110 result from insufficient power. Accordingly, embodiments as disclosed herein provide a simple mechanism for a smooth startup process for system 100.

Power supplies 110 are configured to provide standby powers 125 to management unit 120 through a standby output 121-1, 121-2, 121-3 through 121-n (hereinafter, collectively referred to as "standby outputs 121") and a main power through a main output 131-1, 131-2, 131-3 through 131-n (hereinafter, collectively referred to as "main outputs 131"), when an input power signal has been received in system 100.

System 100 includes a resistor 150 configured to receive a standby signal 115-1, 115-2, 115-3 through 115-n (hereinafter, collectively referred to as "standby signals 115") from each of power supplies 110 to raise a signal voltage 160. A controller 112-1, 112-2, 112-3 through 112-n (hereinafter, collectively referred to as "controllers 112"), in each of power supplies 110, provides standby signal 115 and releases standby power 125 from each of power supplies 110 based on signal voltage 160.

To achieve synchronization of power supplies 110, system 100 uses a signal voltage 160. In some embodiments, signal voltage 160 may be an existing signal, which is of no use during standby startup. In some embodiments, signal voltage 160 may be a dedicated signal. In some embodiments, each of power supplies 110 injects current into resistor 150 by a substantially fixed amount when it is ready to begin supplying standby power, thus increasing the signal voltage by a predetermined amount. This injection of current into the resistor 150 may be referred to herein as a standby signal 115. As subsequent power supplies 110 inject more standby signals 115, the voltage level of the signal 160 increases until a threshold is reached. The reaching of the threshold indicates that a sufficient number of power supplies 110 are ready to supply standby power, and thus when the power supplies 110 detect that the threshold has been reached they may initiate the supplying of standby power. Specifically, when a power supply 110 detects that the signal voltage 160 has reached (equals or exceeds) the threshold value, it raises the signal voltage 160 to a specified value, as described in greater detail below, to initiate the supplying of standby power.

In some embodiments, it may be desirable to replace resistor 150 with an internal resistor 151-1, 151-2, 151-3 through 151-n (hereinafter, collectively referred to as "internal resistors 151") in each of power supplies 110. This may be desirable when a circuit board where power supplies 110 are mounted may not have enough space for a resistor 150 and associated circuitry. In some embodiments, a board manufacturer may not be inclined to add resistor 150 and associated circuitry to the board holding power supplies 110. In yet other embodiments, an already existing legacy board without resistor 150 may be retrofitted with power supplies 110 having internal resistors 151. Accordingly, controllers 112 are configured to select one of resistors 151, to receive standby signals 115 from all power supplies 110. For example, in some embodiments, controllers 112 may select for signal voltage 160 the one internal resistor 151 belonging to the first one of power supplies 110 that is turned 'on.' For example, the controller 112 of each power supply 110 may activate a switch to couple the internal resistor when it senses that a total resistance of an open loop parallel circuit including all power supplies is equal to the internal resistor (e.g., only one power supply is connected, thus indicating the first power supply that is connected). In some embodiments, controller 112 may activate the switch simply based on the location of the power supply in system 100.

As noted above, controllers 112 are configured to raise signal voltage 160 to a specified value when signal voltage 160 reaches a threshold. In some embodiments, to raise signal voltage 160 to the specified value, controller 112 injects an additional current to resistor 150 when signal voltage 160 exceeds the threshold. In some examples, the responsibility for raising the signal to the specified voltage when the threshold has been reached falls on the power supply 110 that actually raised the signal 160 over the threshold; in other words, in these examples the power supply 110 raises the signal 160 over the threshold also raises the signal 160 to the specified value. In other examples, any power supply 110 may raise the signal 160 to the specified value if it detects the signal 160 has reached the threshold; in other words, in these examples the first power supply to detect that the signal 160 has reached the threshold is the one to raise the signal 160 to the specified value.

The signal voltage 160 being raised to the specified value serves as an indicator to all of the power supplies 110 that are ready to supply standby power that it is time to begin supplying standby power. In particular, the controllers 112 of the power supplies 110 monitor the signal voltage 160, and in response to the signal voltage 160 reaching the specified value the controllers 112 automatically enable their power supply 110 to supply standby power to the management unit 120. Because all of the power supplies 110 that are ready to supply standby power begin supplying standby power responsive to the same signal (i.e., responsive to the signal 160 reaching the specified value), the beginning of supplying standby power is substantially synchronized among those power supplies 110. In some embodiments, controllers 112 determine that signal voltage 160 is at the specified value when a difference between signal voltage 160 and the specified value is less than a selected tolerance, or when the signal voltage 160 is equal to or greater than the specified value.

The specified value and the threshold may be selected according to the power specifications of management unit 120. Without limitation, the specified value may be a maximum voltage value, generally greater than the threshold value. Accordingly, in some embodiments, signal voltage 160 is not expected to reach a value larger than the specified value. In some embodiments, controllers 112 are configured to enable standby power 125 to reach management unit 120 when signal voltage 160 is within the specified value. In some embodiments, controllers 112 include a comparator configured to compare signal voltage 160 with the threshold and provide signals 115 to enable standby powers 125 from power supplies 110 to reach the terminal, when the signal voltage exceeds the threshold.

When a power supply 110 receives an input power signal, it may begin a startup process to become ready to supply power. For example, the startup process may include applying an internal bias and powering and starting up the controller 112. The duration of this startup process may vary from one power supply 110 to the next, and the input power signal may also be applied to the power supplies asynchronously. Thus, the power supplies 110 do not necessarily become ready to supply power at the same time. As noted above, the power supplies 110 inject the standby signals 115 when they become ready to supply standby power, and because the power supplies 110 may become ready to supply the standby power at different timings, the power supplies 110 may provide standby signals 115 asynchronously, upon receipt of the input power signal.

In some embodiments, the threshold is selected based on a number of power supplies 110 providing an aggregated standby power (e.g., the sum of standby powers 125) that is greater than a management power necessary to turn management unit 130 'on.' In other words, the threshold is selected based on a minimum desired number of power supplies 110 that should begin supplying standby power together to avoid complications. For example, if it is desired to ensure that at least three power supplies 110 are ready to supply standby power before the standby power is released, then the threshold value may be set to, for example, 2.5·ΔV, where ΔV is the voltage amount by which each standby signal 115 raises the signal voltage 160. Setting the threshold value to 2.5ΔV ensures that three power supplies 110 are ready to supply standby power because the signal voltage 160 passes 2.5ΔV only after three power supplies 110 have injected a standby signal 115. The minimum number of power supplies 110 that are needed to begin supplying standby power may vary from system to system, and thus in some examples the threshold value may be variable set based on the current configuration of the system to ensure that a sufficient number of power supplies are ready.

Some advantages of system 100 is that resistor 150 may be a weak pull down resistor (e.g., low cost, and using low current). In addition, in some embodiments, voltage signal 160 can be repurposed once the standby is enabled. In some embodiments, resistor 150 may be located external to power supplies 110. In embodiments where resistors 151 are located internal to the power supply, as each power supply is installed, the total resistance is reduced (as the power supplies may be coupled in parallel). In some embodiments, only one of internal resistors 151 is enabled as a pull down resistor for signal voltage 160, for example, the internal resistor 151 for a selected power supply bay, or to enable only the internal resistor 151 belonging to the first power supply 110 that becomes online.

Figure 2:
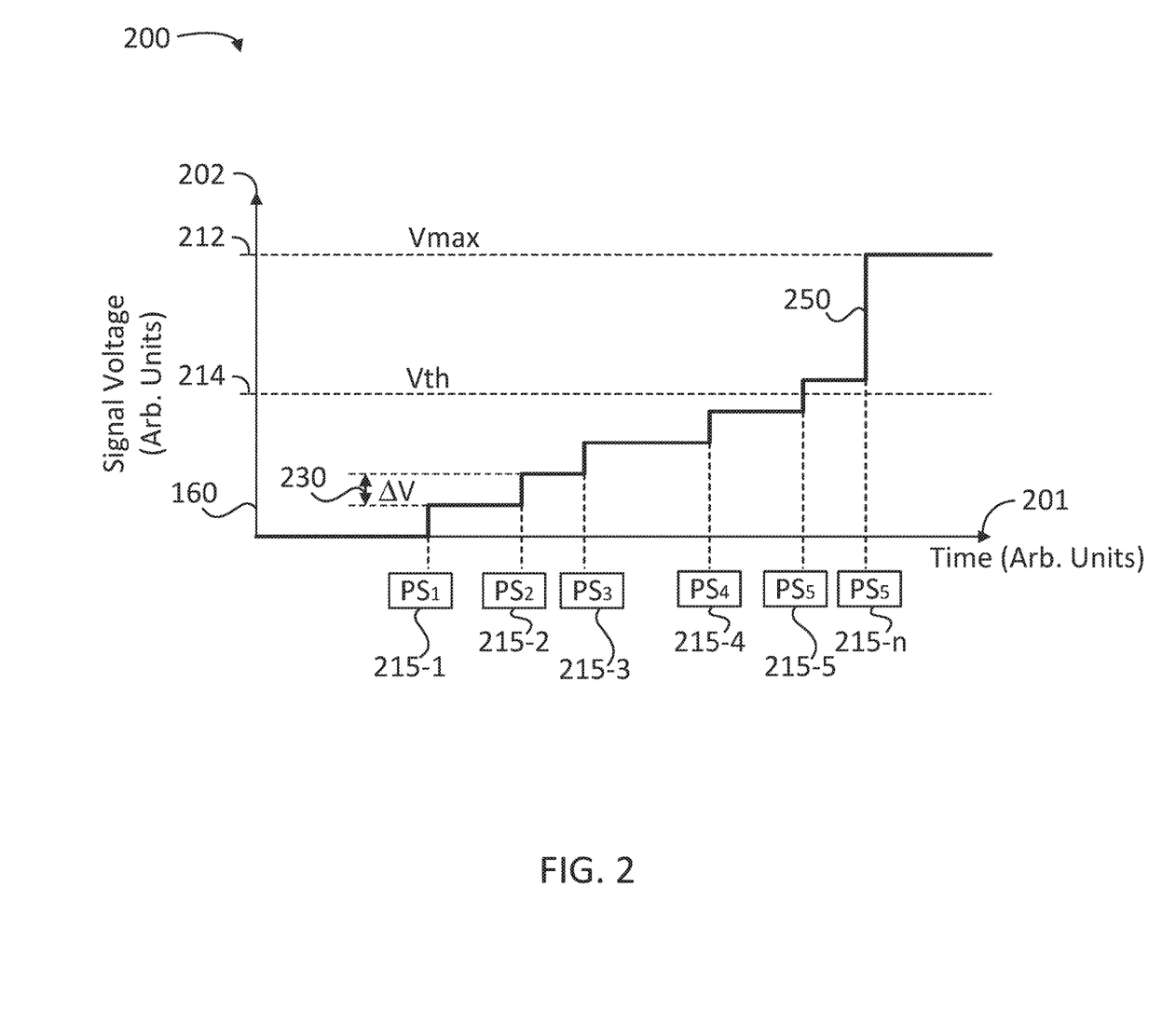
FIG. 2 illustrates a chart with a curve for a signal voltage for the multiple power supplies of FIG. 1 as a function of time, according to some embodiments.

FIG. 2 illustrates a chart 200 with a curve 250 for signal voltage 160 for power supplies 110 as a function of time, according to some embodiments. The abscissae (X-axis) indicates time 201, in arbitrary units, and the ordinates (Y-axis) indicate signal voltage 202, in arbitrary units. At a time t=0, the system (e.g., system 100) is turned 'on.' As each of the power supplies $PS_1$, $PS_2$, $PS_3$, $PS_4$, and $PS_5$ (e.g., power supplies 110) goes online (e.g., becomes ready to supply standby power), it injects a standby signal 215-1, 215-2, 215-3, 215-4, 215-5 through 215-$n$ (hereinafter, collectively referred to as "standby signals 215"), into a resistor (e.g., resistor 150), to raise the voltage in curve 250 by an amount 230 (ΔV). In some embodiments, it may be desirable that all of the controllers inject the same current so that the standby signal is the same and increment ΔV 230 is fixed. Having each standby signal 215 raise the voltage of the signal 160 by a substantially fixed amount ΔV enables each controller 112 to know precisely how many power supplies 110 are ready to supply standby power based on the current voltage value of the signal 160.

The precise timing and order in which power supplies $PS_1$ through $PS_5$ go online and increase signal voltage 160 by an amount ΔV 230 may be unknown, and indeterminate. However, each of the controllers in each power supply (e.g., controller 112) is configured to compare the value of signal voltage 160 with threshold voltage 214 ($V_{th}$), and with selected value $V_{max}$ 212.

In some embodiments, the values of ΔV 230 and $V_{th}$ 214 are selected based on a standby power (ΔP) provided by each of the power supplies, and a management power (MP) used by the management unit. For example, the values of ΔV and Vth may be selected so as to satisfy the formula $$(k-1) \times \Delta V < V_{th} < k \times \Delta V \qquad (1)$$

where k is an integer corresponding to the minimum number of power supplies 110 that are needed to power the management unit. Specifically, k=ROUNDUP(MP/ΔP), or put another way, k, is the smallest integer that satisfies k≥MP/ΔP".

the power available with at least k power supplies is sufficient to power up the management unit $$MP \leq k \times \Delta P \qquad (2)$$

In some embodiments, the value ΔP is lower than the maximum power that each standby power is designed to supply. Accordingly, by satisfying Eqs. 1 and 2, a system as disclosed herein may turn 'on' the management unit without overloading any of the individual power supplies.

Without loss of generality, and for illustrative purposes only, the power supplies are labeled from 1 to 5 according to the time sequence at which each power supply goes on line. Thus, the controllers in the power supplies associated with standby signals 215 may determine that signal voltage 160 is below $V_{th}$ 214. Accordingly, up to the point in time when standby signal 215-4 is injected, none of the power supplies releases a standby power to the management unit. When PS$_5$ injects standby signal 215-5, signal voltage 160 rises above Vth 214. Accordingly, when the fifth power supplies provides standby signal PS$_5$, the controller of one of the power supplies determines that signal voltage 160 is higher than Vth 214, and then injects additional current that raises signal voltage 160 up to, or very close to, $V_{max}$ 212. In the example of FIG. 2, the fifth power supply PS$_5$ raises the signal 160 to $V_{max}$, but in other examples another one of the power supplies that detects the threshold Vth being met could raise the signal 160 to $V_{max}$.

In embodiments as disclosed herein, when the controllers for the rest of the power supplies determine that signal voltage 160 has risen to $V_{max}$ 212, then the standby power output from each of the power supplies is released to the management unit. This ensures that, upon power up of the system, the standby power released to the management unit will be sufficient to turn it 'on' and no overload errors may occur to any of the power supplies.

Figure 3:
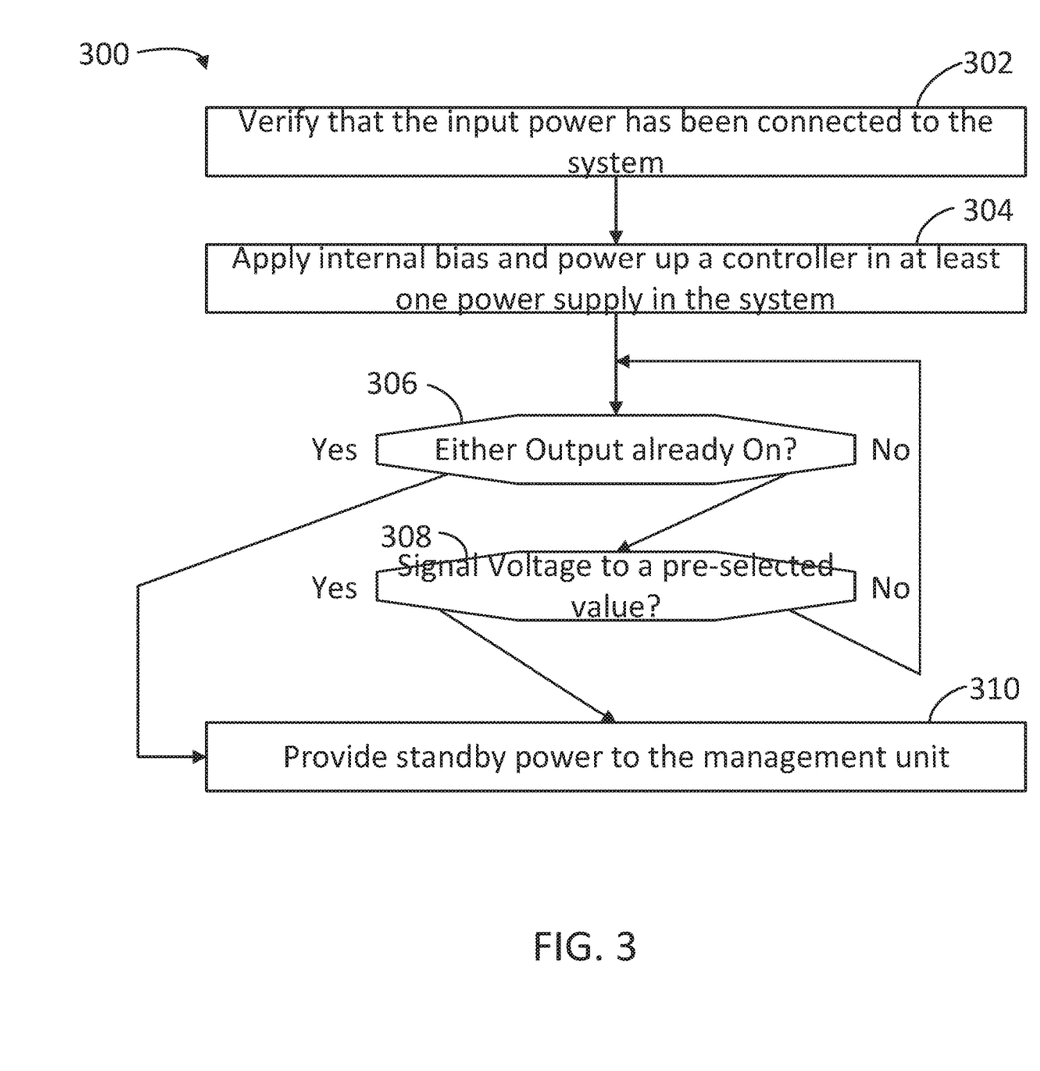
FIG. 3 illustrates a flow chart indicating steps in a method for synchronized standby startup of power supplies with current injection, according to some embodiments.

FIG. 3 illustrates a flow chart indicating steps in a method 300 for synchronized standby startup of power supplies with current injection, according to some embodiments. Method 300 may be performed within a system including multiple power supplies, a management (or standby) unit, and a main IT unit (e.g., system 100, power supplies 110, management unit 120, and main IT unit 130). The management unit may be powered by a management power through a standby power from the power supplies (e.g., standby powers 125). The power supplies may provide the standby powers to the management unit through a standby output and a main power through a main output (e.g., standby outputs 121 and main outputs 131), when an input power signal has been received in the system. The system may also include a resistor 150 configured to receive a standby signal (hereinafter, collectively referred to as "standby signals 115") from each of the power supplies to raise a signal voltage (e.g., standby signals 115 and 215, and signal voltage 160). A controller in each of the power supplies provides the standby signal 115 and releases a standby power 125 (e.g., controllers 112, standby signals 115, and standby powers 125) from each of power supplies based on the signal voltage.

In some embodiments, a method consistent with the present disclosure may include at least one of the steps illustrated for method 300, performed in any order. For example, embodiments consistent with the present disclosure may include one or more steps in method 300 performed in parallel, simultaneously, quasi-simultaneously, or overlapping in time.

Step 302 includes verifying that the input power has been connected to the system. In some embodiments, step 302 includes receiving a power signal in the controller, the power signal activated by a switch. In some embodiments, the switch may be actuated manually by a user or electronically via a software handle, to the system.

Step 304 includes applying an internal bias and powering up the controller in at least one of the power supplies in the system. In some embodiments, step 304 includes powering up multiples, or all, of the power supplies in the system.

Step 306 includes verifying whether at least one of the standby output or the main outputs of the power supply is 'on' (e.g., one or more of the other power supplies are already supplying power to the loads). The standby output may supply the management unit, and the main output may supply the main IT unit. In some embodiments, step 306 includes verifying that there is no or very little voltage on the output (which would indicate that the standby output and the main outputs of the power supply are 'off'). In embodiments where the power supplies are coupled in parallel, all power supplies can read a common voltage.

When none of the standby output nor the main output in the power supply are 'on,' step 308 includes verifying whether the signal voltage is set to a selected, or maximum, value (e.g., $V_{max}$ 212).

Step 310 includes providing the standby power to the management unit either after step 308, or after step 306 when at least one of the standby output or the main output is 'on.'

Figure 4:
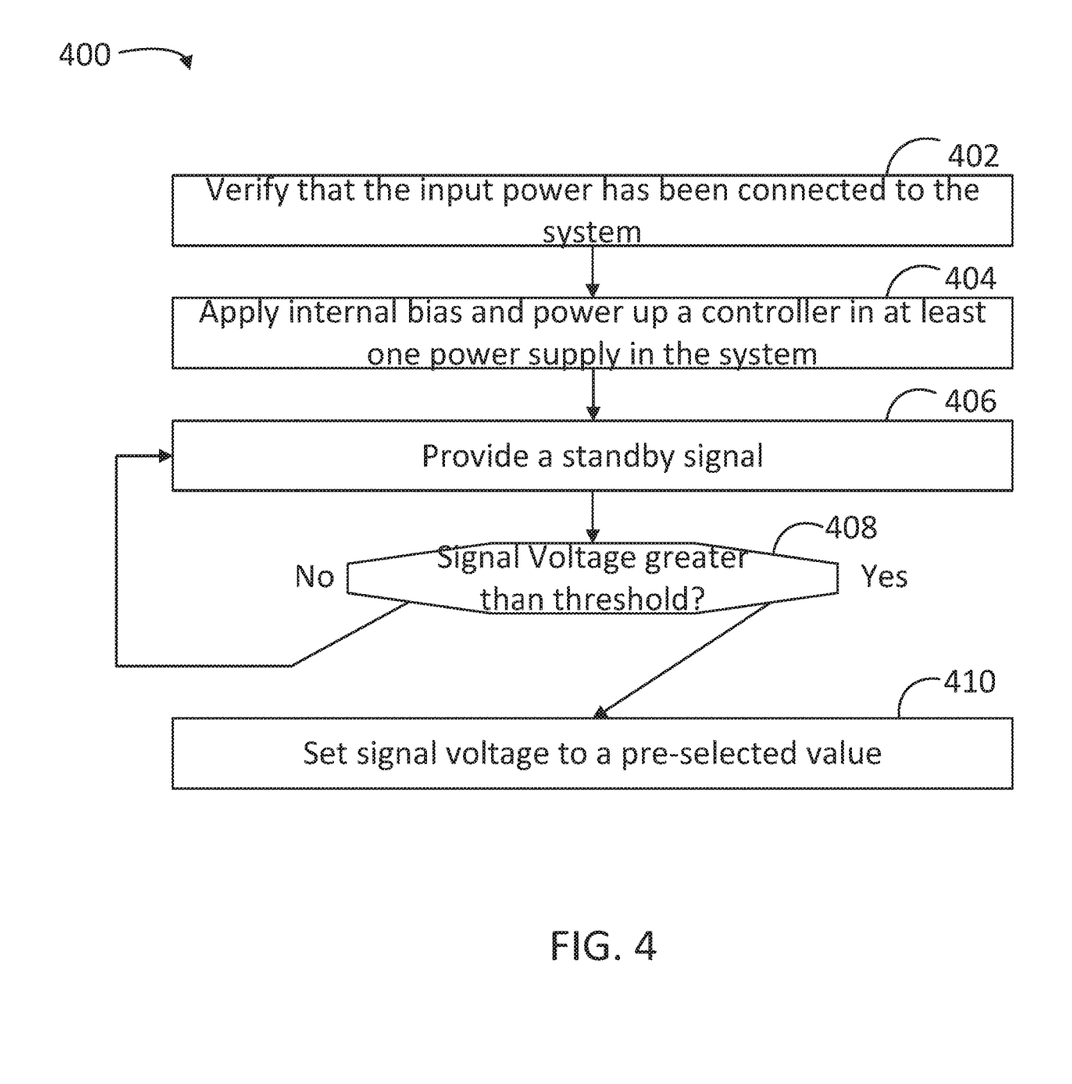
FIG. 4 illustrates a flow chart indicating steps in a method for setting a signal voltage to a maximum value for synchronized standby startup, according to some embodiments.

FIG. 4 illustrates a flow chart indicating steps in a method 400 for setting a signal voltage to a maximum value for synchronized standby startup, according to some embodiments. Method 400 may be performed within a system including multiple power supplies, a management (or standby) unit, and a main IT unit (e.g., system 100, power supplies 110, management unit 120, and main IT unit 130). The management unit may be powered by a management power through a standby power from the power supplies (e.g., standby powers 125). The power supplies may provide the standby powers to the management unit through a standby output and a main power through a main output (e.g., standby outputs 121 and main outputs 131), when an input power signal has been received in the system. The system may also include a resistor 150 configured to receive a standby signal (hereinafter, collectively referred to as "standby signals 115") from each of the power supplies to raise a signal voltage (e.g., standby signals 115 and 215, and signal voltage 160). A controller in each of the power supplies provides the standby signal 115 and releases a standby power 125 (e.g., controllers 112, standby signals 115, and standby powers 125) from each of the power supplies based on the signal voltage 160. In some embodiments, method 400 is performed by each controller to utilize the signal voltage to synchronize startup.

In some embodiments, a method consistent with the present disclosure may include at least one of the steps illustrated for method 400, performed in any order. For example, embodiments consistent with the present disclosure may include one or more steps in method 400 performed in parallel, simultaneously, quasi-simultaneously, or overlapping in time.

Step 402 includes verifying that the input power has been connected to the system.

Step 404 includes applying an internal bias and powering up a controller in at least one power supply in the system. In some embodiments, step 404 includes applying the internal bias to multiple, or all, of the power supplies in the system.

Step 406 includes providing a standby signal. In some embodiments, step 406 includes injecting a current to the resistor to increment the signal voltage by a selected amount (e.g., ΔV 230).

Step 408 includes verifying whether the signal voltage is greater than a threshold (e.g., Vth 214). When the signal voltage is less than or equal to the threshold, then method 400 is repeated from step 406.

When the signal voltage is greater than the threshold, step 410 includes setting the signal voltage to a pre-selected, or maximum, value (e.g., $V_{max}$ 212). In some embodiments, step 410 may include injecting a current into the resistor to raise the signal voltage to the pre-selected value.

Figure 5:
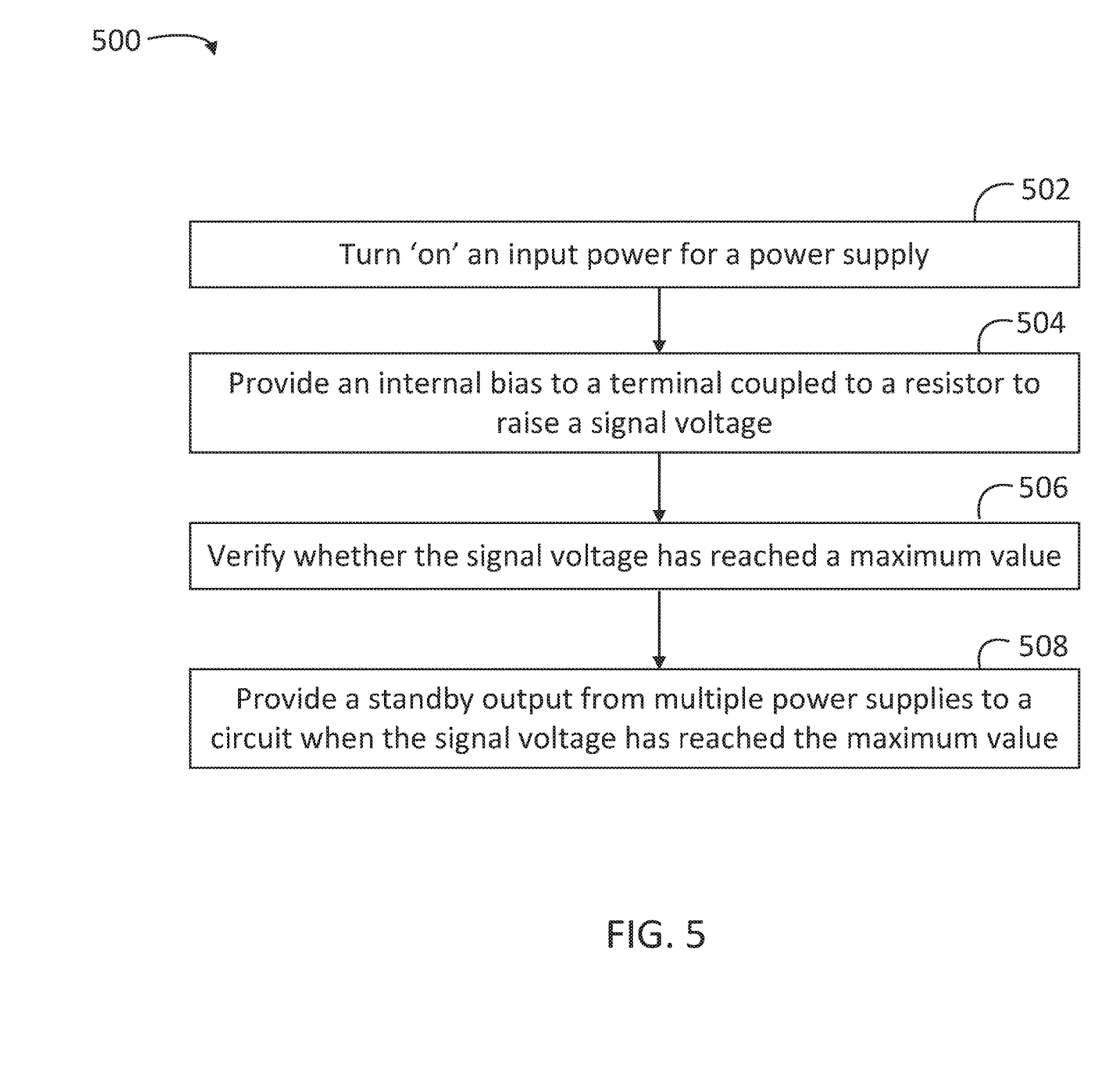
FIG. 5 illustrates a flow chart indicating steps in a method for synchronized startup of a management controller, according to some embodiments.

FIG. 5 illustrates a flow chart indicating steps in a method 500 for synchronized startup of a management controller, according to some embodiments. Method 500 may be performed within a system including multiple power supplies, a management (or standby) unit, and a main IT unit (e.g., system 100, power supplies 110, management unit 120, and main IT unit 130). The management unit may be powered by a management power through a standby power from the power supplies (e.g., standby powers 125). The power supplies may provide the standby powers to the management unit through a standby output and a main power through a main output (e.g., standby outputs 121 and main outputs 131), when an input power signal has been received in the system. The system may also include a resistor 150 configured to receive a standby signal (hereinafter, collectively referred to as "standby signals 115") from each of the power supplies to raise a signal voltage (e.g., standby signals 115 and 215, and signal voltage 160). A controller in each of the power supplies provides the standby signal 115 and releases a standby power 125 (e.g., controllers 112, standby signals 115, and standby powers 125) from each of power supplies based on the signal voltage.

In some embodiments, a method consistent with the present disclosure may include at least one of the steps illustrated for method 500, performed in any order. For example, embodiments consistent with the present disclosure may include one or more steps in method 500 performed in parallel, simultaneously, quasi-simultaneously, or overlapping in time.

Step 502 includes turning 'on' an input power for a power supply. In some embodiments, step 502 includes periodically sending a signal to a system controller to verify a status bit for the input power. The status bit may have a 'low' state to indicate that the input power is turned 'off,' and a 'high' state to indicate that the input power is turned 'on.'

Step 504 includes providing an internal bias to a terminal coupled to a resistor, to raise a signal voltage. In some embodiments, step 504 includes injecting a current to the resistor to increment the signal voltage by a selected amount (e.g., ΔV 230).

Step 506 includes verifying whether the signal voltage is within a maximum value. In some embodiments, step 506 includes receiving, from a controller in a second power supply, a signal indicative of the signal voltage having the maximum value. In some embodiments, step 506 includes providing a signal to a second power supply indicative that the signal voltage has been updated to the maximum value. In some embodiments, step 506 includes comparing, with a voltage comparator, the signal voltage with the maximum value.

Step 508 includes providing a standby output from multiple power supplies to a circuit when the signal voltage is within the maximum value. In some embodiments, step 508 includes providing the standby output to a management unit in the circuit. In some embodiments, step 508 includes raising the signal voltage to the maximum value when the signal voltage is above a threshold value. In some embodiments, step 508 includes injecting an additional current to the terminal to raise the signal voltage to the maximum value when the signal voltage exceeds a threshold value. In some embodiments, step 508 includes conditioning the signal voltage as a signal from a controller to the circuit when the standby output is provided. In some embodiments, step 508 includes providing the standby output to a management unit in the circuit. In some embodiments, step 508 includes providing the standby output to a management unit in the circuit.

Multiple variations and modifications are possible and consistent with embodiments disclosed herein. Although certain illustrative embodiments have been shown and described here, a wide range of modifications, changes, and substitutions is contemplated in the foregoing disclosure. While the above description contains many specifics, these should not be construed as limitations on the scope of the embodiment, but rather as exemplifications of one or another preferred embodiment thereof. In some instances, some features of the present embodiment may be employed without a corresponding use of the other features. Accordingly, it is appropriate that the foregoing description be construed broadly and understood as being given by way of illustration and example only, the spirit and scope of the embodiment being limited only by the appended claims.

What is claimed is:

1. A system, comprising:
multiple power supplies, each of the multiple power supplies configured to provide a standby power to a management circuit in the system through a standby output and a main power through a main output, when an input power signal has been received for the system;
a resistor electrically coupled to each of the multiple power supplies, wherein the resistor is configured to receive a standby signal comprising a pre-selected current from each of the multiple power supplies to raise a signal voltage between the multiple power supplies and the resistor;
and a controller in each of the multiple power supplies, the controller configured to raise the signal voltage to a specified value when the signal voltage is greater than a threshold, and to enable the standby power from a respective power supply to reach the management circuit when the signal voltage is within the specified value.

2. The system of claim 1, wherein to raise the signal voltage to a maximum value the controller is further configured to inject an additional current to the resistor, when the signal voltage exceeds the threshold.

3. The system of claim 1, wherein the management circuit is configured to provide out-of-band management facilities to support multiple servers in a network and is powered by a management power through the standby power from each of the multiple power supplies, and wherein the management power is greater than the standby power provided by each of the multiple power supplies individually.

4. The system of claim 1, wherein the controller includes a memory circuit storing instructions which, when executed by the controller, cause the controller to enable the standby power from each power supply to reach the management circuit.

5. The system of claim 1, wherein the controller includes a comparator configured to compare the signal voltage with the threshold and provide a signal to enable the standby power from one of the multiple power supplies to reach the management circuit when the signal voltage exceeds the threshold.

6. The system of claim 1, wherein the multiple power supplies provide the pre-selected current asynchronously, upon receipt of the input power signal.

7. The system of claim 1, wherein the management circuit is configured to provide a management service to multiple servers in a network.

8. The system of claim 1, wherein the threshold is selected based on a number of power supplies that provide an aggregated standby power that is greater than a management power that powers the management circuit.

9. The system of claim 1, wherein the controller is configured to determine that the signal voltage is within the specified value when a difference between the signal voltage and the specified value is less than a selected tolerance.

10. The system of claim 1, wherein each power supply includes an internal resistor, and the controller is configured to select the resistor configured to receive the standby signal as the internal resistor from one of the multiple power supplies.

\* \* \* \* \*